US012332580B2

(12) United States Patent
Suzuki et al.

(10) Patent No.: US 12,332,580 B2
(45) Date of Patent: Jun. 17, 2025

(54) IMAGE FORMING APPARATUS INCLUDING A HOUSING WITH A COVER TO STORE A TONER BOTTLE

(71) Applicants: Tatsuya Suzuki, Kanagawa (JP); Hiroaki Nieda, Kanagawa (JP); Naoki Matsuda, Kanagawa (JP)

(72) Inventors: Tatsuya Suzuki, Kanagawa (JP); Hiroaki Nieda, Kanagawa (JP); Naoki Matsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/388,262

(22) Filed: Nov. 9, 2023

(65) Prior Publication Data

US 2024/0160125 A1 May 16, 2024

(30) Foreign Application Priority Data

Nov. 10, 2022 (JP) ................................ 2022-180265

(51) Int. Cl.
*G03G 15/08* (2006.01)
*G03G 15/04* (2006.01)
*G03G 21/18* (2006.01)

(52) U.S. Cl.
CPC ..... *G03G 15/0868* (2013.01); *G03G 15/0409* (2013.01); *G03G 21/1842* (2013.01); *G03G 2215/066* (2013.01); *G03G 2221/1687* (2013.01)

(58) Field of Classification Search
CPC .......... G03G 15/0409; G03G 15/0867; G03G 15/0868; G03G 21/1842; G03G 2215/066; G03G 2221/1687
See application file for complete search history.

(56) References Cited

U.S. PATENT DOCUMENTS

| | | | | |
|---|---|---|---|---|
| 11,811,988 | B2 * | 11/2023 | Tanaka | G03G 21/1633 |
| 2007/0140708 | A1 | 6/2007 | Yonekawa et al. | |
| 2020/0379372 | A1 * | 12/2020 | Nohara | G03G 15/0886 |
| 2022/0004141 | A1 | 1/2022 | Kita et al. | |

FOREIGN PATENT DOCUMENTS

| | | | |
|---|---|---|---|
| JP | 2007-168132 | A | 7/2007 |
| JP | 2010-256557 | A | 11/2010 |
| JP | 2011-059296 | A | 3/2011 |
| JP | 2021-189371 | A | 12/2021 |
| JP | 2022-016900 | A | 1/2022 |

* cited by examiner

*Primary Examiner* — Hoang X Ngo
(74) *Attorney, Agent, or Firm* — XSENSUS LLP

(57) ABSTRACT

An image forming apparatus includes a housing. The housing stores a toner bottle and has an insertion opening and a cover. The toner bottle is insertable to the insertion opening. The cover has an opening and openably closable the insertion opening. The toner bottle is visible from the opening of the cover at a closed position.

20 Claims, 15 Drawing Sheets

IMAGE FORMING APPARATUS INCLUDING A HOUSING WITH A COVER TO STORE A TONER BOTTLE

CROSS-REFERENCE TO RELATED APPLICATION

This patent application is based on and claims priority pursuant to 35 U.S.C. § 119(a) to Japanese Patent Application No. 2022-180265, filed on Nov. 10, 2022, in the Japan Patent Office, the entire disclosure of which is hereby incorporated by reference herein.

BACKGROUND

Technical Field

Embodiments of the present disclosure generally relate to an image forming apparatus.

Related Art

One type of image forming apparatus includes a toner bottle that is attachable to and detachable from an apparatus main body and a bottle cover that opens and closes an insertion opening into which the toner bottle is inserted.

SUMMARY

This specification describes an improved image forming apparatus that includes a housing. The housing stores a toner bottle and has an insertion opening and a cover. The toner bottle is insertable to the insertion opening. The cover has an opening and openably closable the insertion opening. The toner bottle is visible from the opening of the cover at a closed position.

This specification also describes an improved image forming apparatus that includes a projecting component and a housing. The housing stores a toner bottle and has an insertion opening and a cover. The toner bottle is insertable to the insertion opening. The cover has an opening and openably closable the insertion opening. At least a part of the projecting component enters the opening of the cover from an outside surface of the cover, and the outside surface is an opposite side of a surface to face the insertion opening when the cover is fully opened.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
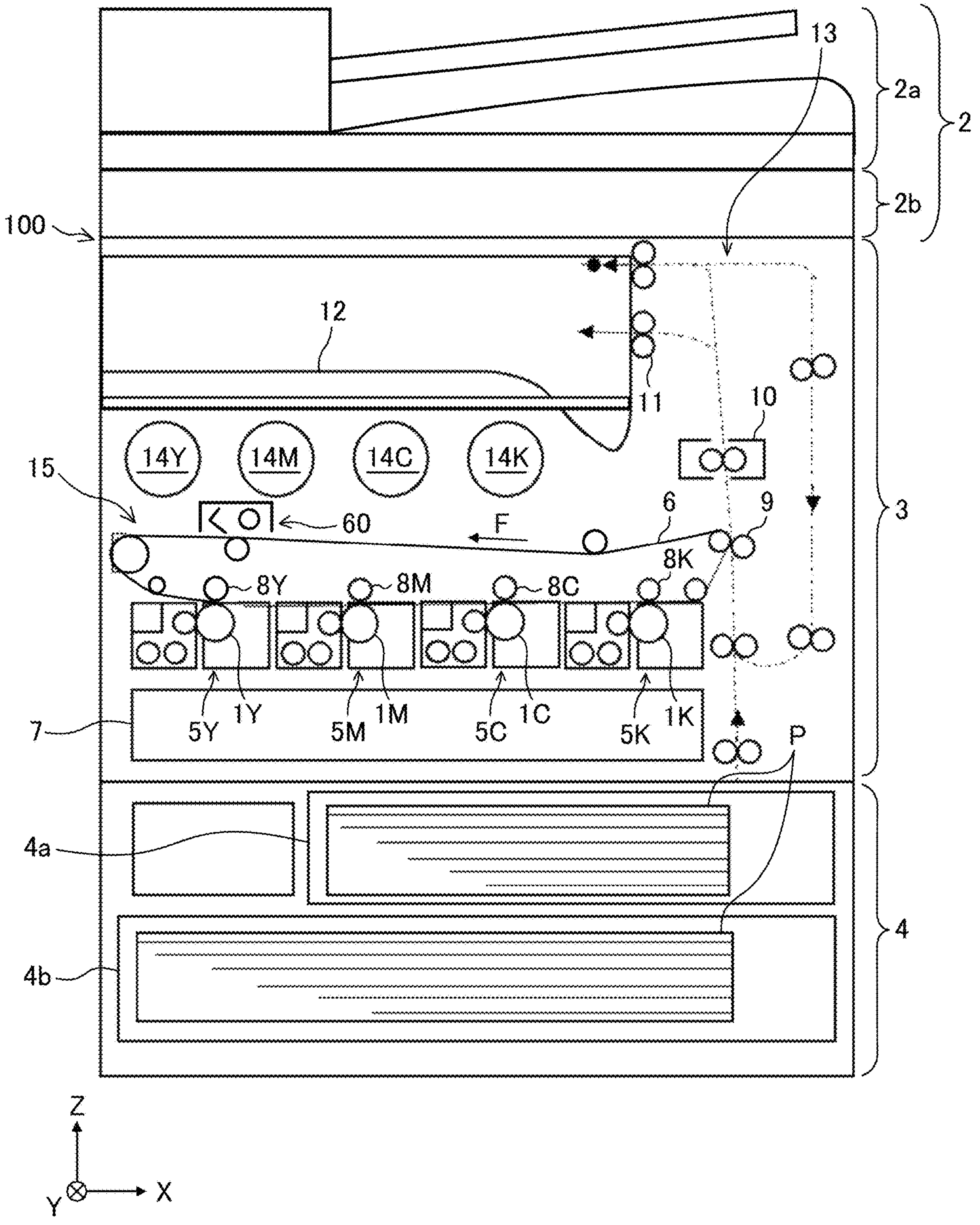
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

With reference to drawings, descriptions are given below of embodiments of the present disclosure. In the drawings illustrating embodiments of the present disclosure, elements or components having identical or similar functions or shapes are given similar reference numerals as far as distinguishable, and redundant descriptions are omitted.

The following describes an electrophotographic image forming apparatus according to an embodiment of the present disclosure.

FIG. 1 is a schematic diagram illustrating a configuration of an image forming apparatus 100 according to the present embodiment.

In FIG. 1, a vertical direction in the image forming apparatus 100 is indicated by an arrow Z, a front-back direction in the image forming apparatus 100 is indicated by an arrow Y, and a left-right direction in the image forming apparatus 100 is indicated by an arrow X.

The image forming apparatus 100 includes an image forming section 3, a sheet feed section 4, and an image reading device 2 that reads an image of a document as an image forming target. The image reading device 2 is disposed above the image forming section 3 and includes a document feeder 2*a* and a scanner 2*b*. The sheet feed section 4 is disposed below the image forming section 3 and includes two sheet trays 4*a* and 4*b* for storing sheets P.

The image forming section 3 includes an intermediate transfer unit 15 including an intermediate transfer belt 6 and four image forming units 5Y, 5M, 5C, and 5K for forming respective colors. The intermediate transfer belt 6 rotates in a direction indicated by an arrow F in FIG. 1. The image forming units 5Y, 5M, 5C, and 5K are arranged along the intermediate transfer belt 6. The image forming units 5Y, 5M, 5C, and 5K include photoconductors 1Y, 1M, 1C, and 1K, respectively, as drum-shaped image bearers. In addition, the image forming section 3 includes an exposure device 7.

The intermediate transfer unit 15 includes the intermediate transfer belt 6 having an endless shape and wound around multiple support rollers, primary transfer rollers 8Y, 8C, 8M, and 8K, a belt cleaner 60 to clean the surface of the intermediate transfer belt 6. The primary transfer rollers 8Y, 8M, 8C, and 8K are disposed inside the loop of the intermediate transfer belt 6 and transfer the toner images from the photoconductors 1Y, 1M, 1C, and 1K onto the intermediate transfer belt 6. A secondary transfer roller 9 is disposed downstream from the primary transfer rollers 8Y, 8M, 8C, and K in a direction that the intermediate transfer belt 6 moves. The secondary transfer roller 9 faces the intermediate transfer belt 6. In addition, the image forming section 3 includes a fixing device 10 to fix an image onto the sheet P and an output roller pair 11 that are above the secondary transfer roller 9.

The four image forming units 5Y, 5M, 5C, and 5K have a similar configuration except for the color of toner used therein. In the following description, the suffixes Y, M, C, and K are omitted when color discrimination is not necessary. Around the photoconductor 1, the image forming unit 5 includes a charging device to charge the surface of the photoconductor 1 and a developing device to develop a latent image on the photoconductor 1 with toner into a toner image. Additionally, the image forming unit 5 includes a cleaning device to clean the surface of the photoconductor 1 after the toner image is transferred from the photoconductor 1 to the intermediate transfer belt 6.

Operations of the image forming apparatus 100 according to the present embodiment are described below.

In response to receiving a start signal to start image formation, a controller 130 in the image forming apparatus 100 controls a driver to start rotating the intermediate transfer belt 6. The driver also starts rotating the photoconductor 1Y In the image forming unit 5Y for forming the yellow toner image, and the charging device uniformly charges the photoconductor 1Y. The exposure device 7 irradiates the photoconductor 1Y with a laser beam to form an electrostatic latent image. The developing device develops the electrostatic latent image to form the yellow toner image on the photoconductor 1Y. Similarly, the image forming units 5M, 5C, and 5K form a magenta toner image, a cyan toner image, and a black toner image on the photoconductors 1M, 1C, and 1K, respectively. With the movement of the intermediate transfer belt 6, the primary transfer rollers 8Y, 8M, 8C, and 8K sequentially transfer the yellow, magenta, cyan, and black toner images from the photoconductors 1Y, 1M, 1C, and 1K to the intermediate transfer belt 6, respectively to form a composite color image on the intermediate transfer belt 6. The controller 130 performs the image forming operations for forming the yellow, magenta, cyan, and black toner images at different timings from the upstream side to the downstream side in the direction that the intermediate transfer belt 6 moves so that the yellow, magenta, cyan, and black toner images are transferred to and superimposed on the same position of the intermediate transfer belt 6.

On the other hand, the sheet feed section 4 feeds the sheet P from the upper sheet tray 4*a* or the lower sheet tray 4*b*, and conveyance rollers convey the sheet P to a secondary transfer nip formed by the intermediate transfer belt 6 and the secondary transfer roller 9. The secondary transfer roller 9 transfers the composite color image on the intermediate transfer belt 6 onto the sheet P to form a color image on the sheet P. The sheet P bearing the color image is sent to the fixing device 10 to fix the color image onto the sheet P. After the color image is fixed onto the sheet P in the fixing device 10, the output roller pair 11 ejects the sheet P to stack the sheet P on an output tray 12, or the sheet P is sent to a reverse path 13 to form a toner image on the other side of the sheet P.

The cleaning device in each of the image forming units 5Y, 5M, 5C, and 5K cleans residual toner on each of the photoconductors 1Y, 1M, 1C, and 1K after the toner image is transferred. The belt cleaner 60 cleans residual toner on the intermediate transfer belt 6 after the composite color image is transferred.

The above-described image formation consumes toner in each of the developing devices. The image forming apparatus 100 includes toner bottles 14Y, 14M, 14C, and 14K filled with yellow, magenta, cyan, and black toners, respectively, and illustrated on the upper left side in FIG. 1. A predetermined amount of toner is supplied from each toner bottle to each developing device through a toner conveyance path. The arrangement order of the four image forming units 5Y, 5M, 5C, and 5K and the toner bottles 14Y, 14M, 14C, and 14K is not limited to the example illustrated in FIG. 1. The toner bottle of the present disclosure is not limited to a toner container having a bottle shape. The toner bottle of the present disclosure may have a box shape or may be a toner cartridge.

When the image forming apparatus 100 according to the present embodiment forms a copy of the document, the document having a sheet shape is set on the document feeder 2*a* of the image reading device 2. After the document is set on the document feeder 2*a*, pushing a copy start switch causes the image reading device 2 to start a document reading operation. Specifically, the document feeder 2*a* conveys the document, and the scanner 2*b* reads the document.

In parallel with the document reading operation, the devices in the image forming units 5Y, 5M, 5C, and 5K, the intermediate transfer belt 6, the secondary transfer roller 9, and the fixing device 10 start operations. Based on image data read by the image reading device 2, the exposure device 7 is driven and controlled to form the yellow, magenta, cyan, and black toner images on the photoconductors 1Y, 1M, 1C, and 1K, respectively.

The yellow, magenta, cyan, and black toner images are transferred onto the intermediate transfer belt 6 and superimposed on the intermediate transfer belt 6 to form a four color toner image.

Almost simultaneously with the start of the document reading operation, the sheet feed section 4 starts a sheet feeding operation. The sheet feed section 4 includes the sheet trays 4*a* and 4*b* accommodated and overlapped in the image forming apparatus 100, In the sheet feeding operation, one of the sheet trays 4*a* and 4*b* feeds the sheet P. The conveyance rollers convey the fed sheet P toward the secondary transfer nip.

Figure 2:
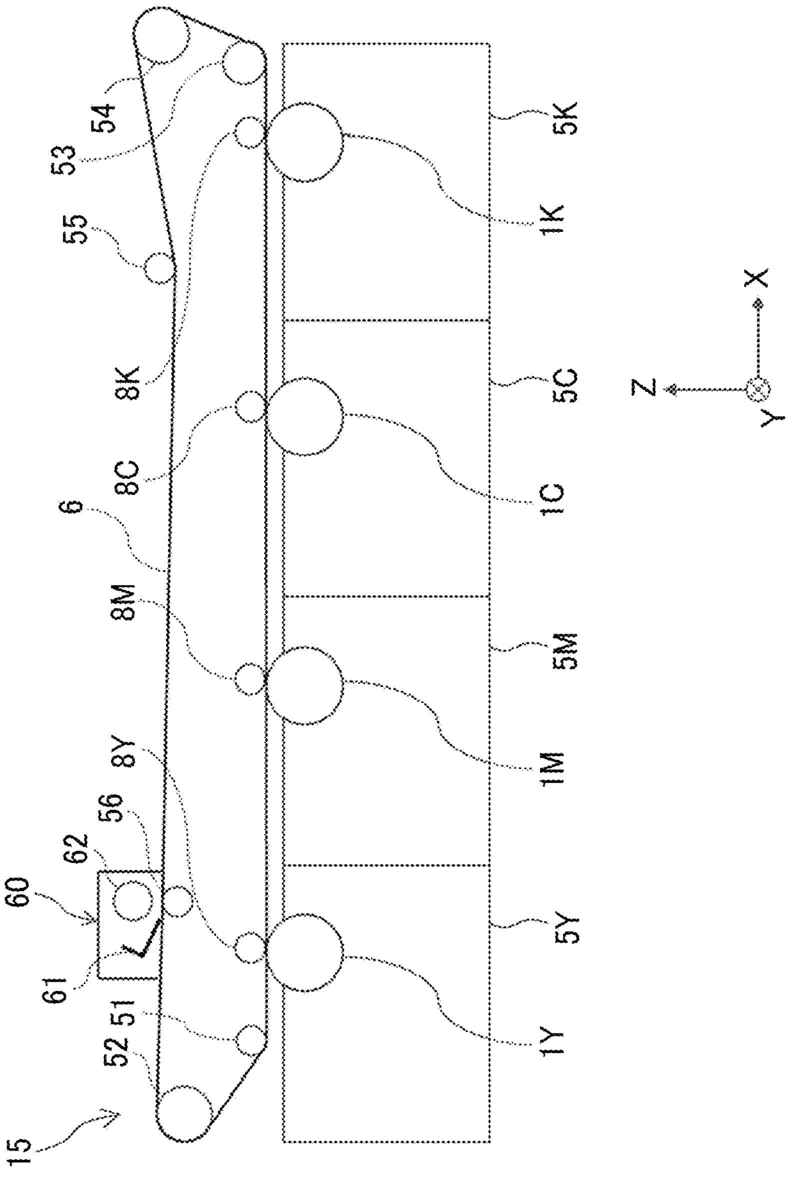
FIG. 2 is a schematic view of an intermediate transfer unit.

FIG. 2 is a schematic view of the intermediate transfer unit 15.

As illustrated in FIG. 2, the intermediate transfer unit 15 includes the intermediate transfer belt 6 and the belt cleaner 60.

A rotation driver drives and rotates any one of a secondary transfer backup roller 54, a cleaning facing roller 56, a tension roller 55, and support rollers 51, 52, and 53 that stretch the intermediate transfer belt 6. The above-described structure rotates the intermediate transfer belt 6 in the direction indicated by the arrow F in FIG. 1.

The belt cleaner 60 includes a cleaning blade 61 serving as a cleaner and a cleaning conveying screw 62 to convey waste toner scraped off by the cleaning blade 61 to the outside of the belt cleaner 60.

Figure 3:
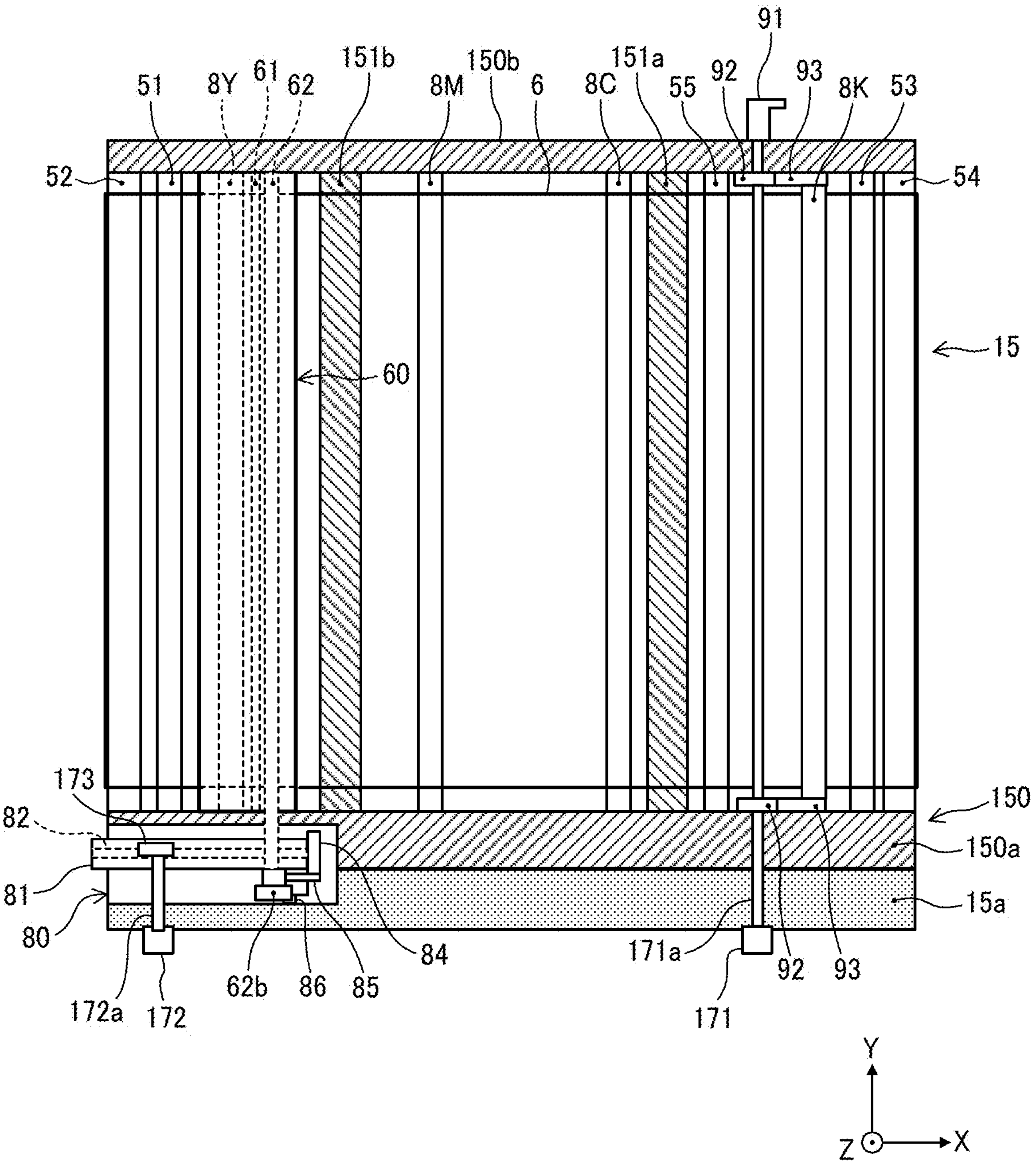
FIG. 3 is a schematic plan view of the intermediate transfer unit.

FIG. 3 is a schematic plan view of the intermediate transfer unit 15.

The intermediate transfer unit 15 includes a transfer frame 150. The transfer frame 150 rotatably supports the secondary transfer backup roller 54, the cleaning facing roller 56, the tension roller 55, and the support rollers 51, 52, and 53 over which the intermediate transfer belt 6 is stretched. The transfer frame 150 includes a front frame 150*a*, a rear frame 150*b*, and two stays 151*a* and 151*b*. One end of each of the two stays 151*a* and 151*b* is fixed to the front frame 150*a*, and the other end thereof is fixed to the rear frame 150*b*.

The front frame 150*a* and the rear frame 150*b* rotatably support the secondary transfer backup roller 54, the cleaning facing roller 56, the tension roller 55, and the support rollers 51, 52, and 53. A front transfer unit cover 15*a* made of resin is assembled to the front frame 150*a*. In addition, a waste toner conveyor 80 is disposed on the front side of the intermediate transfer unit 15. The waste toner conveyor 80 conveys the waste toner conveyed to the outside of the belt cleaner 60 by the cleaning conveying screw 62 to a main body waste toner conveyance path 120 (see FIGS. 5A and 5B). The waste toner conveyor 80 includes a waste toner conveyance path 81 slidable in the lateral direction of the intermediate transfer unit 15 and a waste toner conveying screw 82 inside the waste toner conveyance path 81.

An input gear 62*b* is disposed on a front end of a shaft 62*a* (see FIG. 4) of the cleaning conveying screw 62. A drive motor transmits a driving force to the input gear 62*b* to drive and rotate the cleaning conveying screw 62. The input gear 62*b* meshes with an intermediate gear 86. The intermediate gear 86 integrally rotates with a first bevel gear 85. The first bevel gear 85 meshes with a second bevel gear 84 disposed at one end of the shaft of the waste toner conveying screw 82. The above-described structure transmits the driving force from the drive motor to the second bevel gear 84 via the input gear 62*b*, the intermediate gear 86, and the first bevel gear 85 to drive and rotate the waste toner conveying screw 82.

The intermediate transfer unit 15 includes a first operation lever 171 and a second operation lever 172. The first operation lever 171 projects from a right portion of the front transfer unit cover 15*a*. The second operation lever 172 projects from a left portion of the front transfer unit cover 15*a*.

The intermediate transfer unit 15 also includes a first rotation shaft 171*a*, a transfer lock 91, contact-and-separation cams 92, and contact-and-separation arms 93. The first operation lever 171 is attached to a front end of the first rotation shaft 171*a*. A rear end of the first rotation shaft 171*a* penetrates the rear frame 150*b*. The transfer lock 91 is attached to the rear end of the first rotation shaft 171*a*. The contact-and-separation cams 92 are attached to the first rotation shaft 171*a*. One of the contact-and-separation cams 92 is on the inside of the front frame 150*a*, and the other one of the contact-and-separation cams 92 is on the inside of the rear frame 150*b*. One of the contact-and-separation arms 93 is on the inside of the front frame 150*a*, and the other one of the contact-and-separation arms 93 is on the inside of the rear frame 150*b*. The contact-and-separation cams 92 press the contact-and-separation arms 93 to separate the primary transfer roller 8K for transferring the black toner image from a portion of the intermediate transfer belt 6 facing the photoconductor 1K. When the contact-and-separation cams 92 do not press the contact-and-separation arms 93, the primary transfer roller 8K contacts the portion of the intermediate transfer belt 6 facing the photoconductor 1K.

The second operation lever 172 is attached to a front end of a second rotation shaft 172*a*. A slide cam 173 is attached to the rear end of the second rotation shaft 172*a* to slide the waste toner conveyance path 81 in the lateral direction of the intermediate transfer unit 15.

Pulling out the intermediate transfer unit 15 from the front side of the image forming apparatus 100 enables detaching the intermediate transfer unit 15 from the apparatus main body of the image forming apparatus 100. In order to pull out the intermediate transfer unit from the apparatus main body, a user rotates the first operation lever 171 and the second operation lever 172. Rotating the first operation lever 171 and the second operation lever 172 enables the intermediate transfer unit 15 to be attached to and detached from the apparatus main body.

Figure 4A:
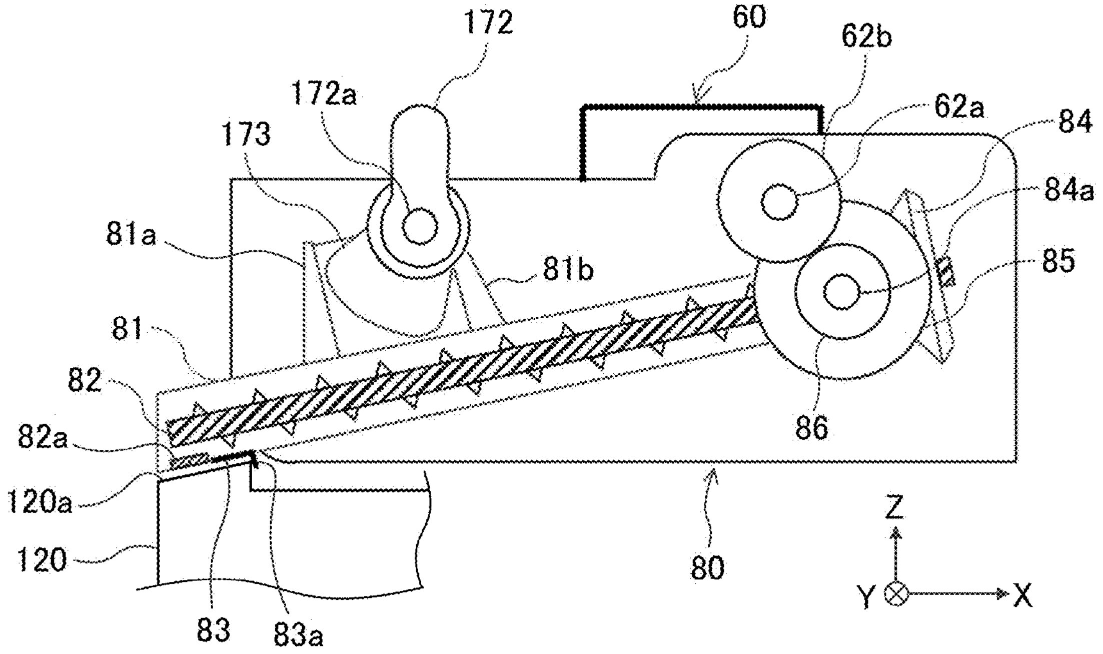
FIGS. 4A and 4B are schematic views to illustrate operations of a second operation lever that slides a waste toner conveyance path.
Figure 4B:
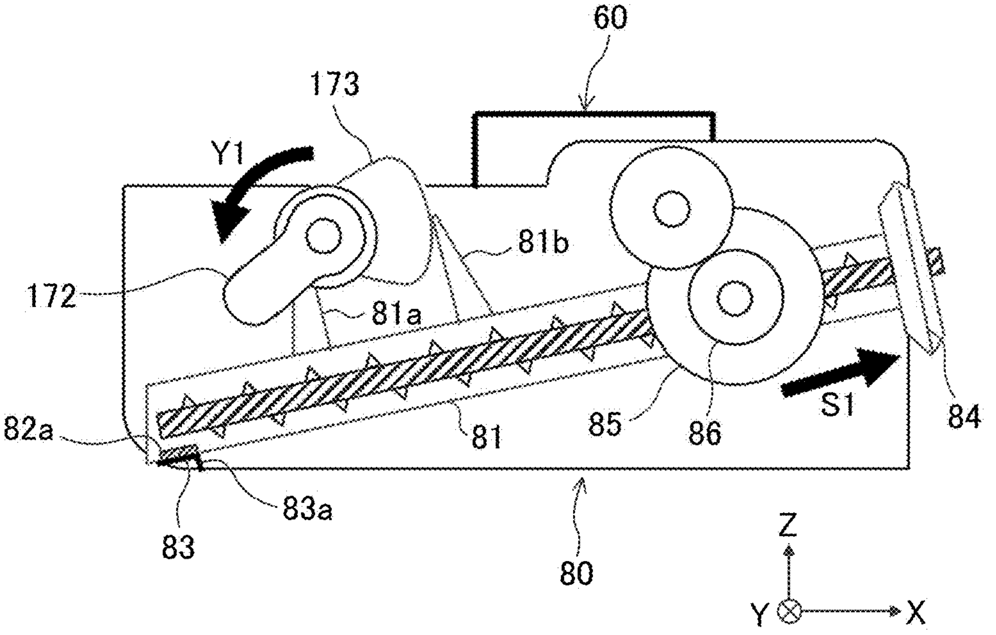

FIGS. 4A and 4B are schematic views to illustrate operations of the second operation lever 172 that slides the waste toner conveyance path 81. FIG. 4A illustrates the second operation lever 172 after the intermediate transfer unit 15 is correctly installed in the image forming apparatus 100. FIG. 4B illustrates the second operation lever 172 operated to slide the waste toner conveyance path 81 when the intermediate transfer unit 15 is attached to or detached from the image forming apparatus 100.

As illustrated in FIG. 4A, the slide cam 173 attached to the second operation lever 172 contacts a pair of contact portions 81*a* and 81*b* on the waste toner conveyance path 81. One contact portion 81*a* is on the left hand of the slide cam 173, and the other contact portion 81*b* is on the right hand of the slide cam 173.

After the intermediate transfer unit 15 is correctly installed in the image forming apparatus 100, the downstream end of the waste toner conveyance path 81 in a direction in which the waste toner is conveyed, which is referred to as a waste toner conveyance direction below, protrudes from the intermediate transfer unit 15 and faces the front side plate of the image forming apparatus 100. Therefore, the intermediate transfer unit 15 cannot be pulled out because the downstream end of the waste toner conveyance path 81 in the waste toner conveyance direction butts the front side plate of the image forming apparatus 100 if the user tries to pull out the intermediate transfer unit 15 from the front side of the image forming apparatus 100.

In addition, a lid 83 is assembled to the waste toner conveyance path 81. The lid 83 is slidable in the lateral direction in FIGS. 4A and 4B to open and close a waste toner discharge port 82*a*. A biasing member such as a spring presses the lid 83 so as to close the waste toner discharge port 82*a*. After the intermediate transfer unit 15 is correctly installed in the image forming apparatus 100, a contact portion 83*a* of the lid 83 butts against an edge of a waste toner receiving port 120*a* of a main body waste toner conveyance path 120 to open the waste toner discharge port 82*a*. The waste toner discharge port 82*a* faces the waste toner receiving port 120*a* of the main body waste toner conveyance path 120.

After the intermediate transfer unit 15 is correctly installed in the image forming apparatus 100, the first bevel gear 85 meshes with the second bevel gear 84 attached to the upstream end of the waste toner conveying screw 82 in the waste toner conveyance direction. The waste toner conveying screw 82 is rotationally driven together with the cleaning conveying screw 62. The cleaning conveying screw 62 conveys tile waste toner to the waste toner conveyance path 81, and the waste toner conveying screw 82 conveys the waste toner to the waste toner discharge port 82*a*. The waste toner is conveyed from the waste toner discharge port 82*a* to the main body waste toner conveyance path 120.

In order to detach the intermediate transfer unit 15 from the apparatus main body, rotating the second operation lever 172 counterclockwise in FIG. 4B, that is, in a direction indicated by an arrow Y1 in FIG. 4B causes the slide cam 173 to come into contact with the contact portion 81*b* disposed on tile right hand of the slide cam 173. Further rotating the second operation lever 172 causes the slide cam 173 to push the contact portion 81*b* toward the right side of the image forming apparatus 100 (that is, +X direction), and the waste toner conveyance path 81 slides toward the right side of the image forming apparatus 100. As a result, tile downstream end of the waste toner conveyance path 81 in the waste toner conveyance direction is retracted into the intermediate transfer unit 15 and does not face the front side plate of the image forming apparatus 100, which enables pulling out the intermediate transfer unit 15 from the front side of the image forming apparatus 100.

When the waste toner conveyance path 81 slides to the right side of the image forming apparatus 100, the contact portion 83*a* of the lid 83 is separated from the waste toner receiving port 120*a*. As a result, the biasing member such as the spring slides the lid 83 toward the left side in FIG. 4B to close the waste toner discharge port 82*a*. The above-described structure can prevent the waste toner in the waste toner conveyance path 81 from being discharged from the waste toner discharge port 82*a* while the intermediate transfer unit is removed from the apparatus main body.

Rotating the second operation lever 172 in FIG. 4B clockwise causes the slide cam 173 to push the contact portion 81*a* disposed on the left hand of the slide cam 173, and the waste toner conveyance path 81 slides toward the left side of the image forming apparatus 100. As a result, the waste toner conveyance path 81 and the second operation lever 172 become as illustrated in FIG. 4A.

Figure 5A:
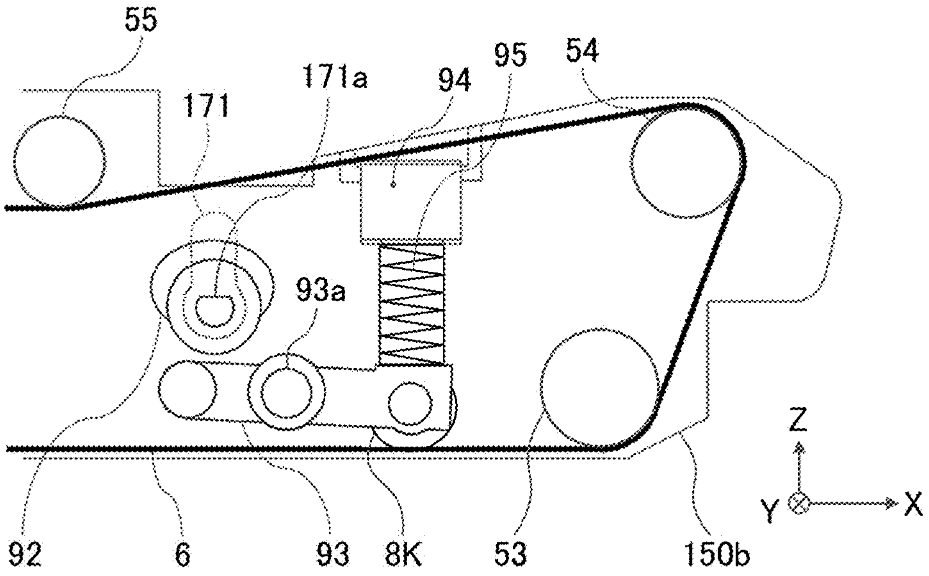
FIGS. 5A and 5B are schematic views to illustrate operations of a first operation lever that moves a primary transfer roller for transferring a black toner image so that an intermediate transfer belt contacts or separates from a photoconductor.
Figure 5B:
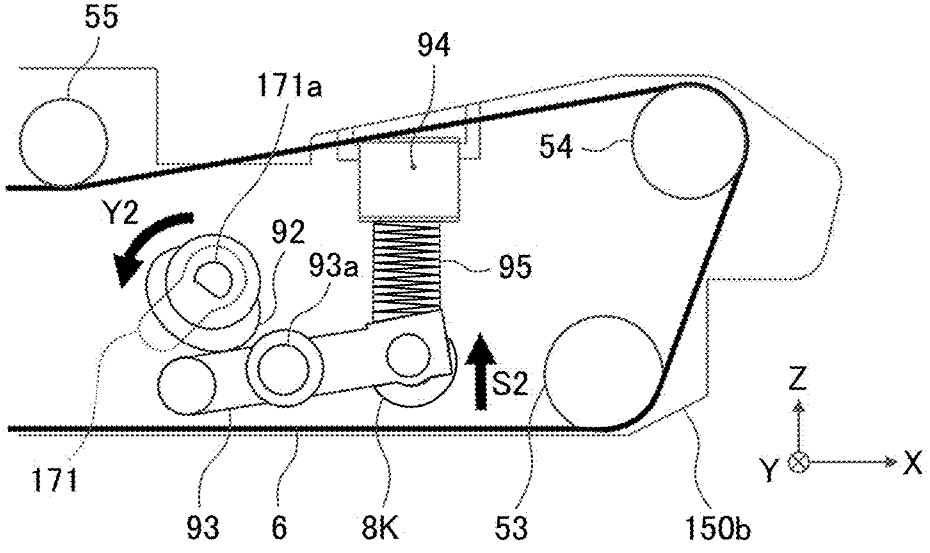

FIGS. 5A and 5B are schematic views to illustrate operations of the first operation lever 171 that moves the primary transfer roller 8K for transferring the black toner image so that the intermediate transfer belt 6 contacts or separates from the photoconductor 1K. FIG. 4A illustrates the second operation lever 172 after the intermediate transfer unit 15 is correctly installed in the image forming apparatus 100. FIG. 4B illustrates the second operation lever 172 operated to slide the waste toner conveyance path 81 when the intermediate transfer unit is attached to or detached from the image forming apparatus 100.

As illustrated in FIG. 5A, a support shaft 93*a* is disposed on the frame and supports the contact-and-separation arm 93. The contact-and-separation arm 93 can rotate about the support shaft 93*a*. one end portion of the contact-and-separation arm 93 (that is a right portion of the contact-and-separation arm 93 from the support shaft 93*a* in FIG. 5A) rotatably supports the primary transfer roller 8K for transferring the black toner image. A contact-and-separation spring 95 applies a force to the one end portion of the contact-and-separation arm 93 toward the photoconductor (that is downward in FIG. 5A).

After the intermediate transfer unit 15 is correctly installed in the image forming apparatus 100, the contact-and-separation cam 92 is separated from the contact-and-separation arm 93 as illustrated in FIG. 5A. At this time, the force applied by the contact-and-separation spring 95 pushes the primary transfer roller 8K for transferring the black toner image so as to contact the photoconductor 1K via the intermediate transfer belt 6.

In order to detach the intermediate transfer unit 15 from the apparatus main body, rotating the first operation lever 171 counterclockwise in FIG. 5B, that is, in a direction indicated by an arrow Y2 in FIG. 5B causes the contact-and-separation cam 92 to push the other end portion of the contact-and-separation arm 93 (that is a left portion of the contact-and-separation arm 93 from the support shaft 93*a* in FIG. 5B). As a result, the contact-and-separation arm 93 rotates counterclockwise in FIG. 5B against the force applied by the contact-and-separation spring 95. The above-described rotation of the contact-and-separation arm 93 moves the primary transfer roller 8K supported on the one end portion of the contact-and-separation arm 93 (that is the right end portion in FIG. 5B) in a direction indicated by an arrow S2 in FIG. 5B and separates the intermediate transfer belt 6 from the photoconductor 1K for forming the black toner image. The above-described structure can prevent rubbing the surface of the photoconductor 1K with the intermediate transfer belt 6 in the intermediate transfer unit 15 that is attached to or detached from the image forming apparatus 100, which prevents the surface of the intermediate transfer belt 6 or the surface of the photoconductor 1K from being damaged.

Regarding the primary transfer rollers 8Y, 8M, and 8C for transferring the yellow, magenta, and cyan toner images, the image forming apparatus 100 includes a contact-and-separation mechanism driven by the driver in the apparatus main body to separate the primary transfer rollers 8Y, 8M, and 8C from the photoconductors 1Y, 1M, and 1K and perform a monochrome mode.

For example, when a front cover 3*a* is opened or when the image forming apparatus is in a standby mode, the driver in the apparatus main body moves the primary transfer rollers 8Y, 8M, and 8C to the positions to separate the intermediate transfer belt 6 from the photoconductors 1Y, 1M, and 1C. As a result, the above-described structure can prevent rubbing the surfaces of the photoconductors 1Y, 1M, and 1C with the intermediate transfer belt 6 in the intermediate transfer unit 15 that is attached to or detached from the image forming apparatus 100.

Figure 6A:
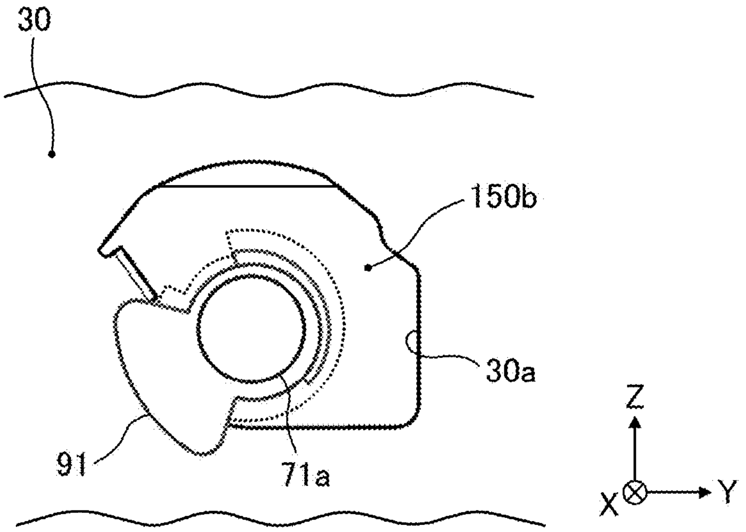
FIGS. 6A and 6B are schematic views to illustrate a transfer lock that locks the intermediate transfer unit to an apparatus main body.
Figure 6B:
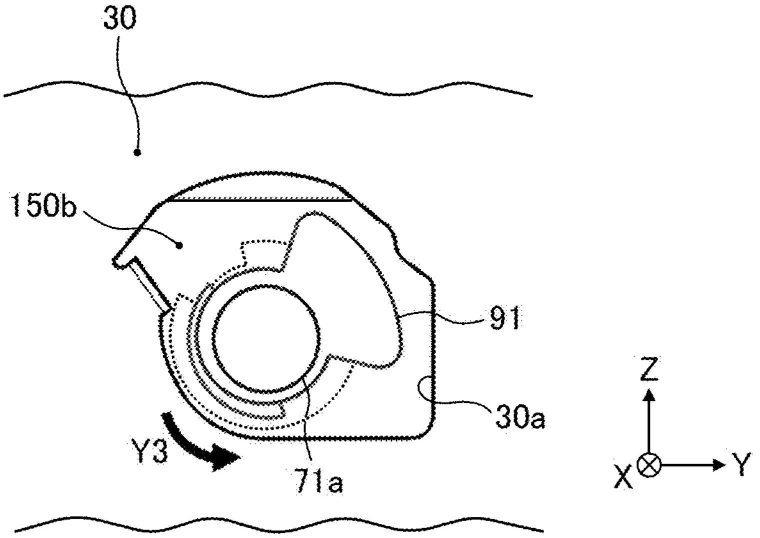

FIGS. 6A and 6B are schematic views to illustrate a transfer lock 91 that locks the intermediate transfer unit 15 to the apparatus main body. In FIG. 6A, the transfer lock 91 locks the intermediate transfer unit 15 to the apparatus main body. In FIG. 6B, the transfer lock 91 unlocks the intermediate transfer unit 15 to the apparatus main body.

FIGS. 6A and 6B are enlarged views of the transfer lock 91 and the periphery of the transfer lock 91 viewed from the rear side of the intermediate transfer unit 15.

The apparatus main body includes a rear plate 30 having an opening 30*a* through which the transfer lock 91 passes. After the intermediate transfer unit 15 is installed in the image forming apparatus 100, the transfer lock 91 passes through the opening 30*a* and is positioned on the rear side of the rear plate 30.

As illustrated in FIG. 6A, the transfer lock 91 that locks the intermediate transfer unit faces the rear side of the rear plate 30. If the user tries to pull out the intermediate transfer unit 15 from the front side of the image forming apparatus 100, the transfer lock 91 butts the rear plate 30 of the apparatus main body and prevents the intermediate transfer unit from being pulled out. As a result, the transfer lock 91 locks the intermediate transfer unit 15.

In order to detach the intermediate transfer unit 15 from the apparatus main body, rotating the first operation lever 171 in the direction indicated by the arrow Y2 in FIG. 5B rotates the transfer lock 91 in a direction indicated by an arrow Y3 in FIG. 6B. As a result, as illustrated in FIG. 5B, the transfer lock 91 does not face the rear plate 30 of the apparatus main body, which enables pulling out the intermediate transfer unit 15 from the front side of the image forming apparatus 100.

Figure 7A:
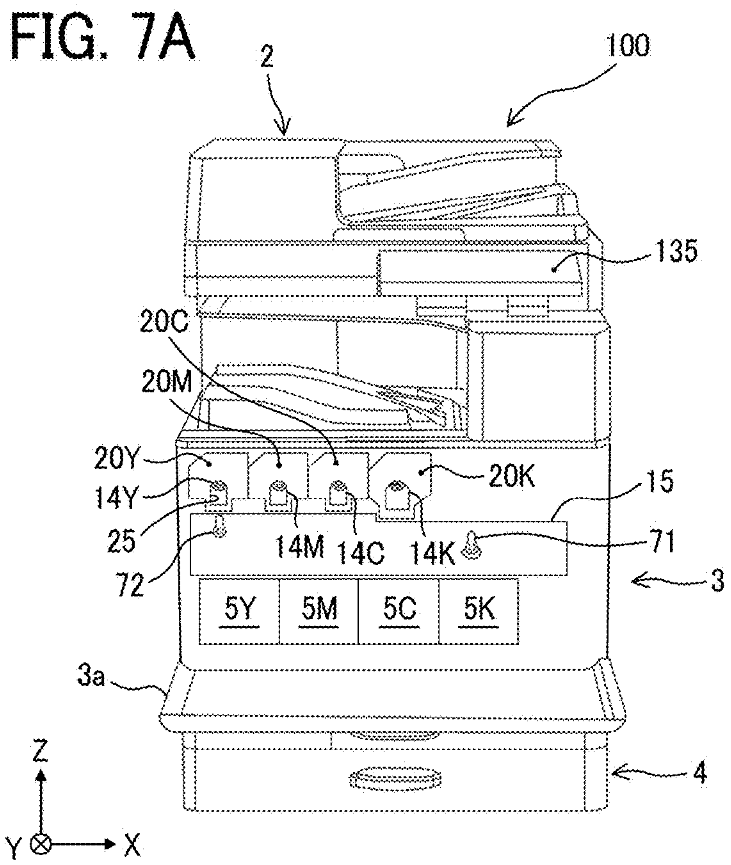
FIG. 7A is a front view of the image forming apparatus in which a front cover is opened.
Figure 7B:
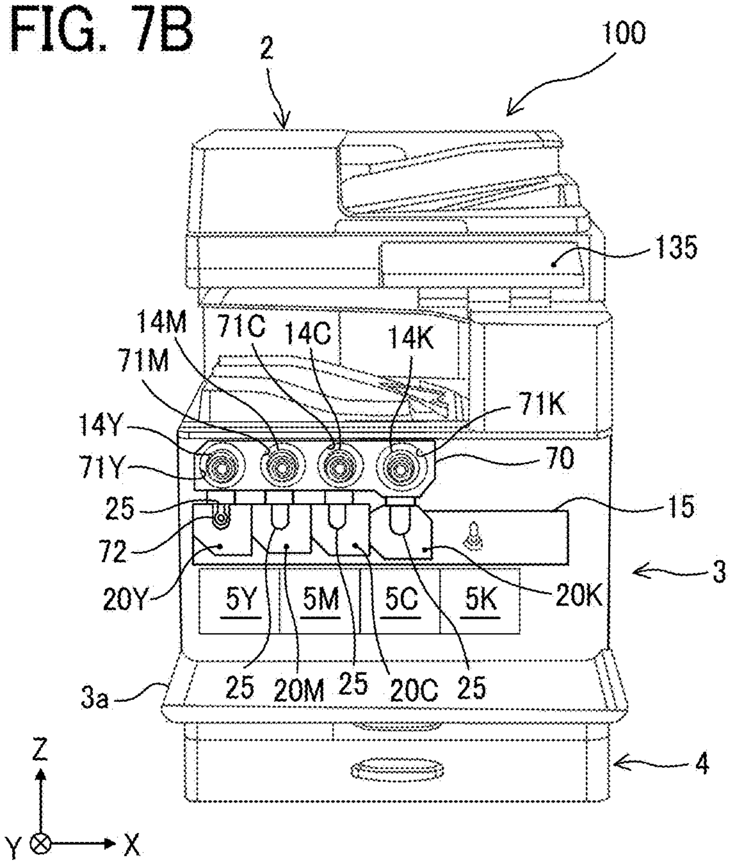
FIG. 7B is a front view of the image forming apparatus in which the front cover and bottle covers are opened.

FIG. 7A is a front view of the image forming apparatus 100 in which the front cover 3*a* is opened, and FIG. 7B is a front view of the image forming apparatus 100 in which the front cover 3*a* and bottle covers 20Y, 20M, 20C, and 20K are opened.

As illustrated in FIG. 7A, the lower end of the front cover 3*a* as an outer cover is rotatably supported by the image forming section 3. Opening the front cover 3*a* exposes the intermediate transfer unit 15 and the image forming units 5Y, 5M, 5C, and 5K. As a result, the intermediate transfer unit 15 and the image forming units can be attached to and detached from the image forming apparatus 100.

In addition, opening the front cover 3*a* exposes the bottle covers 20Y, 20M, 20C, and 20K that open and close bottle insertion openings 71Y, 71M, 71C, and 71K of the bottle housing 70 of the image forming section 3. Opening the bottle covers 20Y, 20M, 20C, and 20K exposes the toner bottles 14Y, 14M, 14C, and 14K stored in the bottle housing 70 of the image forming section 3, and the toner bottles 14Y, 14M, 14C, and 14K can be attached to and detached from the bottle insertion openings 71Y, 71M, 71C, and 71K, respectively.

Lock devices 40 (see FIG. 8), which is described below, lock the bottle covers 20Y, 20M, 20C, 20K at closed positions at which the bottle covers 20Y, 20M, 20C, 20K cover the bottle insertion openings 71Y, 71M, 71C, 71K, respectively. In response to toner depletion of any one of the yellow, magenta, cyan, and black toner in the toner bottles, the controller 130 controls the lock device to unlock the bottle cover corresponding to the toner depletion.

In the present embodiment, opening the front cover 3*a* exposes the bottle covers 20Y, 20M, 20C, and 20K, the intermediate transfer unit 15, and the image forming units 5Y, 5M, 5C, and 5K. Opening the front cover 3*a* enables opening and closing the bottle cover, inserting the intermediate transfer unit 15 and the image forming units 5Y, 5M, 5C, and 5K into the apparatus main body, and pulling out the intermediate transfer unit 15 and the image forming units 5Y, 5M, 5C, and 5K from the apparatus main body. The above-described structure can reduce the number of covers from a structure in which opening front cover 3*a* exposes only the bottle cover. As a result, the above-described structure can reduce the number of components of the image forming apparatus and the cost of the image forming apparatus.

Figure 8A:
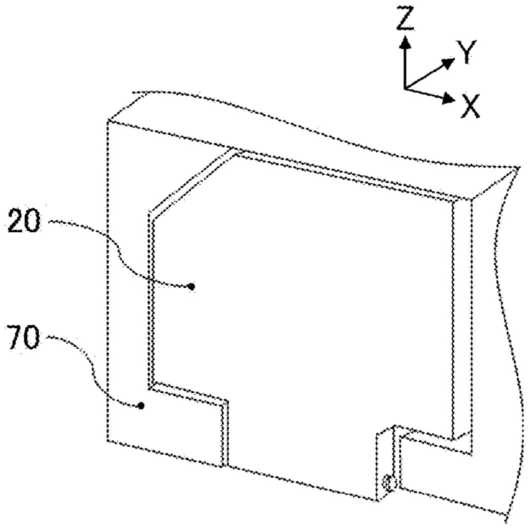
FIG. 8A is a perspective view of a bottle cover according to a comparative example not having an opening.
Figure 8B:
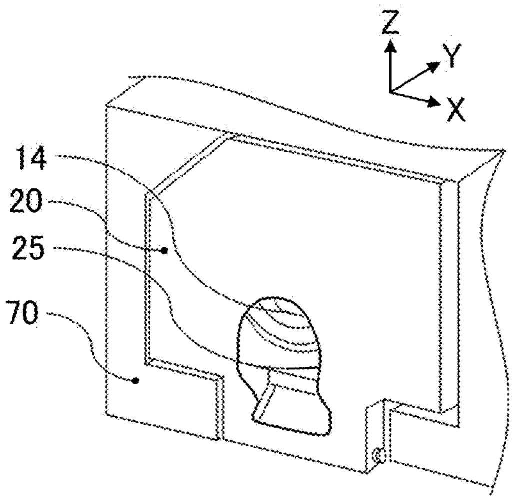
FIG. 8B is a perspective view of a bottle cover according to the present embodiment having the opening.

Each of the bottle covers 20Y, 20M, 20C, and 20K has an opening 25. As illustrated in FIG. 8A, after the bottle cover 20 not having the opening is closed, the toner bottle stored in the bottle housing 70 cannot be visually checked. In contrast, as illustrated in FIGS. 8B and 7A, the bottle cover having the opening 25 enables visually checking the toner bottle accommodated in the bottle housing 70 through the opening 25.

As described below, the opening 25 of the bottle cover 20Y has a shape and is positioned so that the second operation lever 172 enters the opening 25 of the bottle cover 20Y when the bottle cover 20Y is opened. Note that the bottle cover 20Y covers the toner bottle containing the yellow toner.

Each toner bottle rotates to supply toner from the toner bottle to the developing device. The opening in the bottle cover enables checking whether the toner bottle normally rotates by looking through the opening without opening the bottle cover. When a service person performs a maintenance work for the image forming apparatus, the service person can check whether the toner bottle normally rotates without performing a special operation of releasing the lock of the lock device described later, which can simplify the maintenance work.

Alternatively, the bottle cover may include a transparent window. Looking through the transparent window enables checking whether the toner bottle normally rotates. However, the bottle cover 20Y including the transparent window causes a disadvantage that the second operation lever 172 that is a projecting component projecting from the intermediate transfer unit prevents the bottle cover 20Y from opening at a specified opening angle. On the other hand, the bottle cover 20Y having the opening 425 can be opened by the specified opening angle. This is described below with reference to the drawings.

Figure 9:
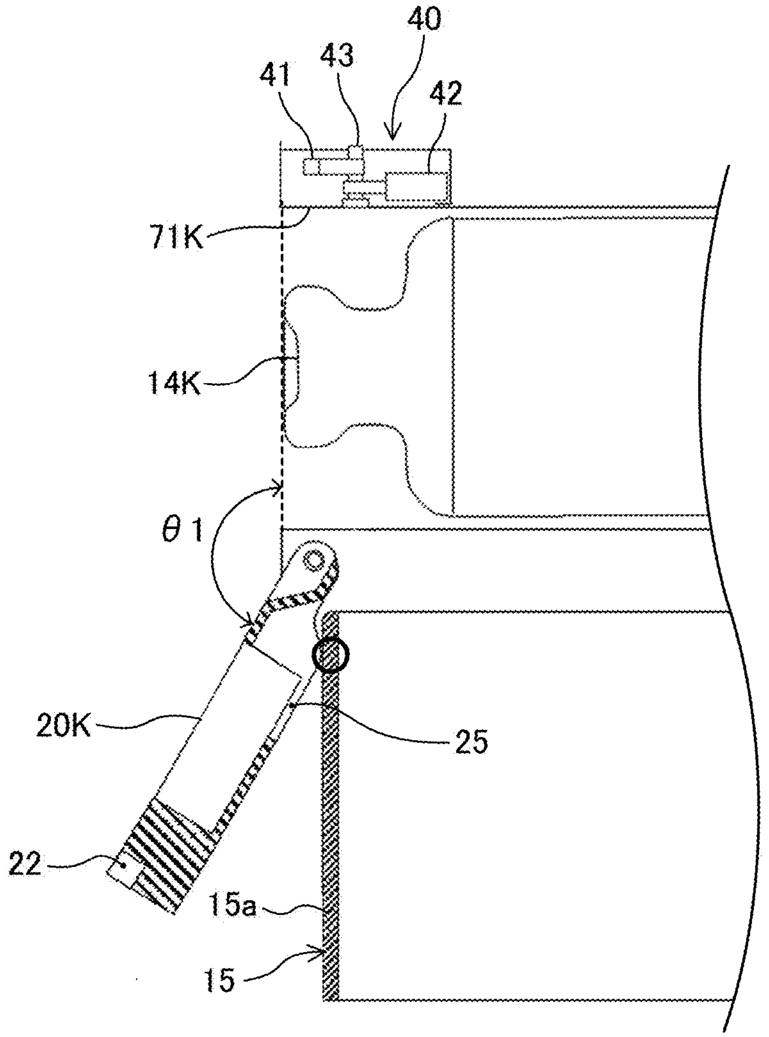
FIG. 9 is a schematic view of the bottle cover opened, the bottle cover for one of a magenta toner bottle, a cyan toner bottle, and a black toner bottle.

As can be seen from FIG. 7A, immediately below the bottle covers 20M, 20C, and 20K other than the bottle cover 20Y, there is no projecting component projecting toward the front of the image forming apparatus, such as the operation lever. Accordingly, as illustrated in FIG. 9, each of the bottle covers 20M, 20C, and 20K other than the bottle cover 20Y contacts the front transfer unit cover 15*a* that is made of resin and deformable in the intermediate transfer unit 15. Each of the bottle covers 20M, 20C, and 20K opens at the opening angle θ1 set to 90° or more. The above-described structure can prevent the bottle cover 20 from interfering with the replacement of the toner bottle 14 and enables easy replacement of the toner bottle 14.

Butting the bottle cover 20 that is opened to the front transfer unit cover 15*a* that is made of resin and deformable in the intermediate transfer unit 15 gives the following advantages. Closing the front cover 3*a* when the bottle cover 20 is not closed (see FIG. 7B) causes the front cover 3*a* to butt against the bottle cover 20 and give impact to the bottle cover 20, but the front transfer unit cover 15*a* made of resin serves as a deformable component of a unit and bends and deforms to absorb the impact. The above-described structure can prevent breakage of the bottle cover 20. In the present embodiment, the deformable component of the unit is not limited to the front transfer unit cover 15*a* made of resin. The unit may be any one of units included in the image forming apparatus. The material of the deformable component may be an elastic member such as rubber instead of resin.

Figure 10:
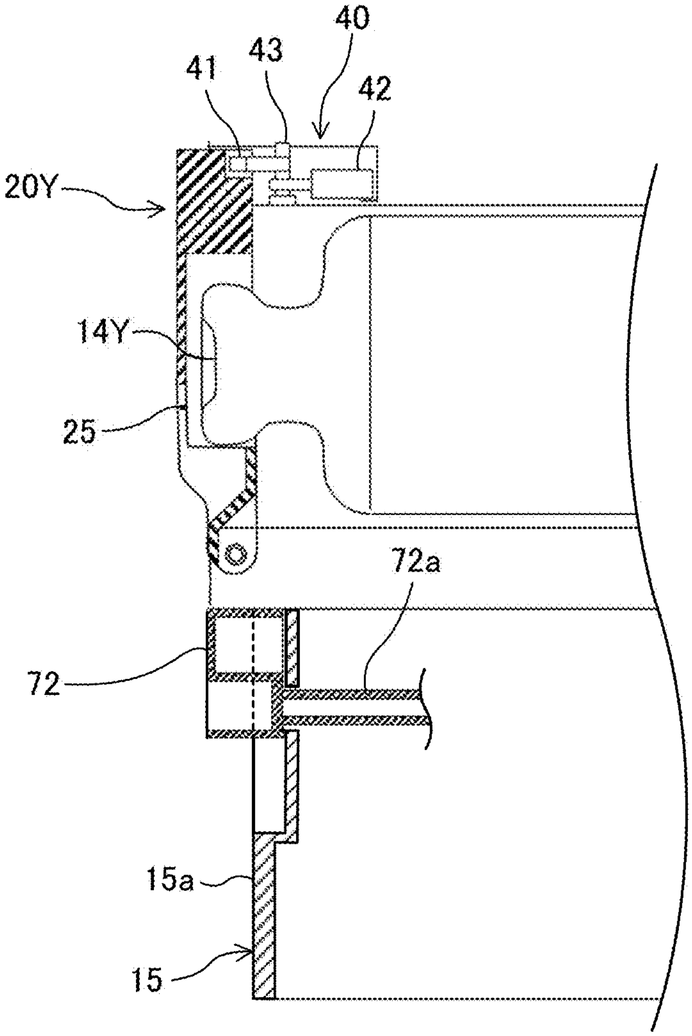
FIG. 10 is a schematic view of the bottle cover closed to cover a yellow toner bottle.

On the other hand, the second operation lever 172 as the projecting component projecting from the front transfer unit cover 15*a* is immediately below the bottle cover 20Y as illustrated in FIG. 10. Accordingly, if the bottle cover 20Y does not have the opening 25, the bottle cover 20Y butts against the second operation lever 172 when the bottle cover 20Y is opened. As a result, unlike the bottle covers other than the bottle cover 20Y, the opening angle θ1 may be less than 90°. The bottle cover 20Y may obstruct replacement of the toner bottle 14Y.

Even if the bottle cover 20Y is opened by 90° or more, the opening angle of the bottle cover 20Y becomes smaller than each of the opening angles of the other bottle covers, and the user may push the bottle cover 20Y to open the bottle cover 20Y by the same opening angle as the opening angle of any one of the other bottle covers. As a result, the second rotation shaft 172*a* to which the second operation lever 172 is attached may be deformed, and the second operation lever 172 may not be able to rotate or the waste toner conveyance path 81 (see FIGS. 3 and 4) may not be able to slide.

When the bottle cover 20Y is not closed, the front cover 3*a* is closed, butts against the bottle cover 20Y, and gives impact to the bottle cover 20Y and the impact may deform the second rotation shaft 172*a*.

Figure 11:
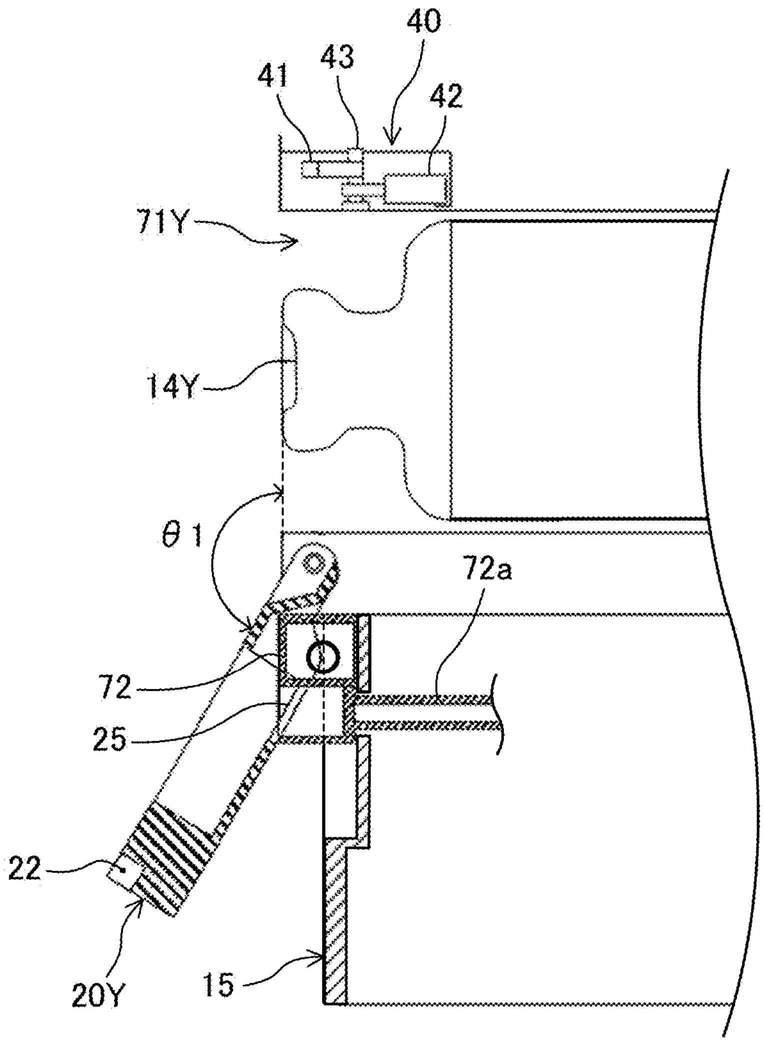
FIG. 11 is a schematic view of the opened bottle cover for the yellow toner bottle.

In the present embodiment, the bottle cover 20Y has the opening 25. As illustrated in FIG. 11, the second operation lever 172 enters the opening 25 of the bottle cover 20Y when the bottle cover 20Y is opened. As a result, the bottle cover 20Y butts against the front transfer unit cover 15*a* similarly to the other bottle covers, and the opening angle θ1 of the bottle cover 20Y can be made equal to the opening angle of any one of the other bottle covers. The bottle cover 20Y having the opening 25 can obtain effects similar to those of the other bottle covers 20M, 20C, and 20K. The above-described structure can prevent the bottle cover 20Y from interfering with the replacement of the toner bottle 14Y and enables easy replacement of the toner bottle 14Y. When the front cover 3*a* butts against the bottle cover 20Y and gives impact to the bottle cover 20Y the front transfer unit cover 15*a* elastically deforms (and bends) to absorb the impact. The above-described structure can prevent breakage of the bottle cover 20Y.

The above-described structure enables designing the opening angle 81 of the bottle cover 20Y to be the same as the opening angle of any one of the other bottle covers, which prevents the user from pushing the bottle cover 20Y to open the bottle cover 20Y similarly to the other bottle covers. In addition, the above-described structure can prevent the deformation of the second rotation shaft 172*a* to which the second operation lever 172 is attached, rotation failure of the second operation lever 172, and failure of sliding the waste toner conveyance path 81.

Only the bottle cover 20Y may have the opening 25. However, designing the bottle covers 20Y, 20M, 20C, and 20K to have the openings 25, respectively and have the same shape is preferable because designing the bottle covers as described above can reduce the parts management cost and the cost increase of the image forming apparatus.

Only the bottle cover 20Y may have the opening. In the image forming apparatus including the bottle cover 20Y having the opening and the other bottle covers not having the opening, the opening can prevent the deformation of the second rotation shaft 172*a* as described above and enables opening the bottle cover 20Y at the opening angle of 90° or more that is the same opening angle as any one of the other bottle covers. Further, similarly to the other bottle covers, the bottle cover 20Y can butt the front transfer unit cover 15*a*, preventing the bottle cover 20Y from being damaged. Note that the projecting component of the present embodiment is not limited to the operation lever of the intermediate transfer unit. Any component may be the projecting component as long as the component has a projecting part entering the opening of the opened bottle cover.

Figure 12:
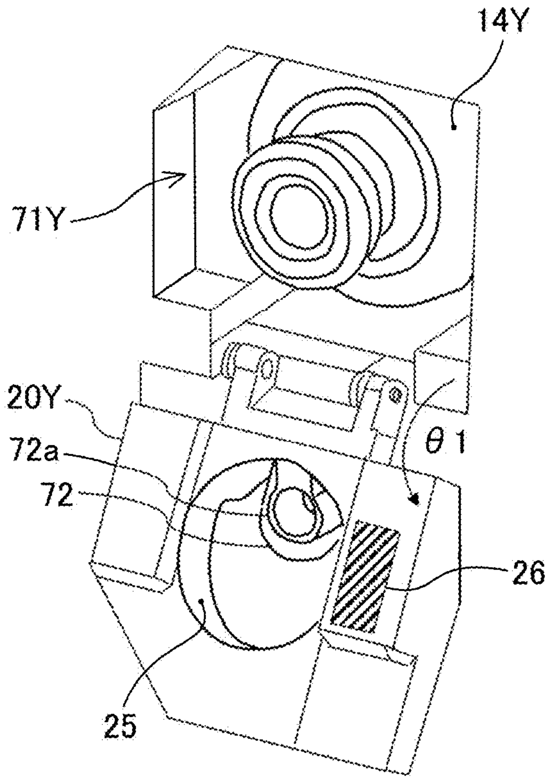
FIG. 12 is a perspective view of the bottle cover having a color identification decal on an inner face of the bottle cover.

In addition, the bottle cover includes a color identification decal 26 as illustrated in FIG. 12. The color identification decal 26 is disposed on the inner face of the bottle cover (the inner face facing the toner bottle) so that a toner bottle containing a different color toner is not erroneously inserted when a new toner bottle is placed. In order to enhance the visibility of the color identification decal 26 on the bottle cover opened, the opening angle θ1 of each bottle cover is preferably set to 180° or less so that the color identification decal 26 does not face downward.

The following describes the lock device 40 to lock the bottle cover at the closed position.

Figure 13A:
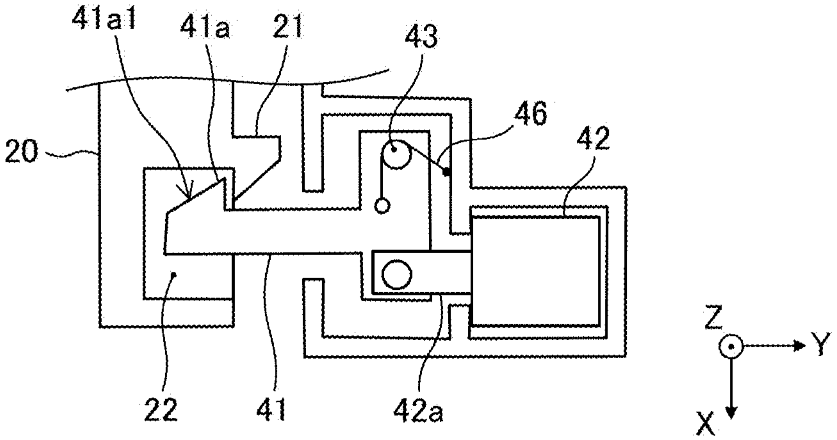
FIGS. 13A and 13B are schematic views of a configuration of a lock device.
Figure 13B:
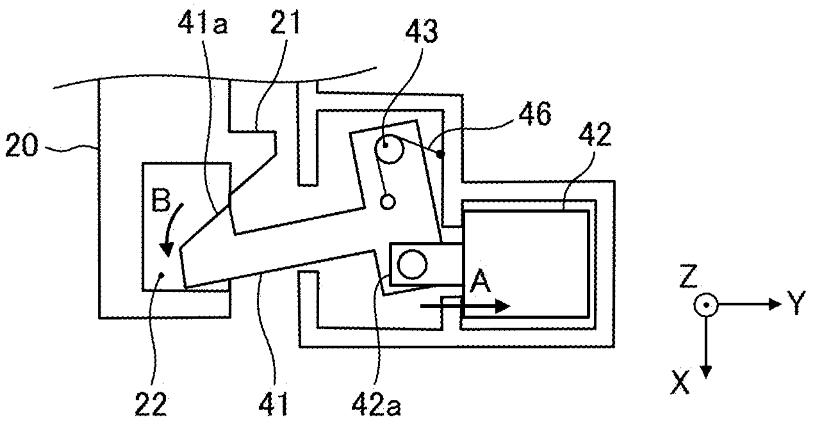

FIGS. 13A and 13B are schematic views of a configuration of the lock device 40. In FIGS. 13A and 13B, the lock device 40 and the periphery of the lock device 40 are viewed from above.

The lock device 40 includes a solenoid 42 and a lock lever 41 including a lock claw 41*a* at a tip of the lock lever 41. The lock device 40 includes a support shaft 43 rotatably supporting the lock lever 41. The lock device 40 includes a torsion spring 46 serving as a biasing member attached to the support shaft 43. The torsion spring 46 applies a force to the lock lever 41 to be positioned at a lock position illustrated in FIG. 13A. The lock lever 41 is rotatably attached to a plunger 42*a* (a movable metallic core) of the solenoid 42.

As illustrated in FIG. 13A, the bottle cover 20 has a locked portion 21 and a lock claw housing 22 into which the lock claw 41*a* of the lock lever 41 enters.

When the bottle cover 20 is locked at a closed position, the lock claw 41*a* of the lock lever 41 enters the lock claw housing 22 and faces the locked portion 21. The lock claw 41*a* is in front of the locked portion 21 in the bottle cover 20. In the above-described structure, opening the bottle cover 20 causes the locked portion 21 to butt the lock claw 41*a*. As a result, the bottle cover 20 is locked at the closed position.

As illustrated in FIG. 13B, energizing the solenoid 42 generates an electromagnetic force pulling the plunger 42*a* in a direction indicated by an arrow A illustrated in FIG. 13B. The plunger 42*a* rotates the lock lever 41 in a direction indicated by an arrow B in FIG. 13B against the force applied by the torsion spring 46. As a result, the lock claw 41*a* of the lock lever 41 does not face the locked portion 21, and the lock is released. Thus, the bottle cover can be opened.

A biasing member such as a torsion spring biases the bottle cover 20 to an open position. After the lock is released, the biasing force of the biasing member automatically rotates the bottle cover 20 to the open position. However, the biasing member is unnecessary if the bottle cover 20 can be moved to the open position by its own weight.

Cutting off the energization of the solenoid 42 loses the electromagnetic force pulling the plungers 42*a*, and the force applied by the torsion spring 46 rotates the lock lever 41 clockwise in FIG. 13B to position the lock lever 41 at the lock position. Subsequently, closing the bottle cover 20 causes the locked portion 21 to butt against an inclined portion 41*a*1 of the lock claw 41*a* of the lock lever 41 at the lock position. Further closing the bottle cover 20 causes the lock lever 41 to rotate counterclockwise in FIGS. 13A and 13B and causes the lock claw 41*a* to climb over the locked portion 21 into the lock claw housing 22. After the lock claw 41*a* enters the lock claw housing 22, the force applied by the torsion spring 46 rotates the lock lever 41 clockwise in FIG. 13A. As a result, the lock claw 41*a* faces the locked portion 21, and the bottle cover 20 is locked.

Figure 14:
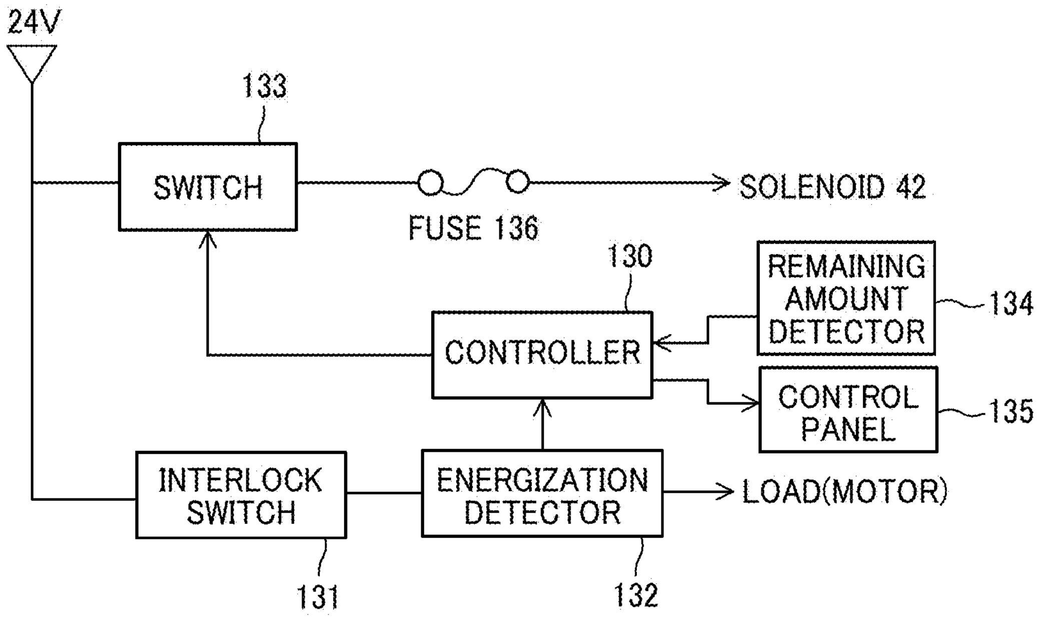
FIG. 14 is a block diagram of a circuit to drive a solenoid.

FIG. 14 is a block diagram of a circuit to drive the solenoid 42.

As illustrated in FIG. 14, the solenoid 42 is coupled to a 24V power supply via a switch 133 and a fuse 136. Opening the front cover 3*a* turns off an interlock switch 131 to cut off an electrical connection between the 24V power supply and a load such as a motor for the image forming section 3. Between the interlock switch 131 and the load, an energization detector 132 is disposed to detect whether a voltage is applied from the 24V power supply to the load such as a motor in the image forming apparatus. When the front cover 3*a* is opened and the interlock switch 131 is turned off, the energization detector 132 detects that no voltage is applied to the load (0V). As a result, the controller 130 can detect that the front cover 3*a* is opened. On the other hand, when the front cover 3*a* is closed and the interlock switch 131 is turned on, the energization detector 132 detects that the voltage is applied to the load. As a result, the controller 130 can detect that the front cover 3*a* is closed. As described above, an opening-and-closing detection system in the present embodiment to detect whether the front cover 3*a* is opened or closed includes the interlock switch 131 and the energization detector 132.

Alternatively, the opening-and-closing detection system to detect whether the front cover 3*a* is opened or closed may include, for example, a filler disposed on the front cover 3*a* and an optical sensor to detect the filler. Based on an output voltage from the optical sensor, the controller 130 may determine whether the front cover 3*a* is opened or closed. The opening-and-closing detection system may include a magnet disposed on the front cover 3*a* and a magnetic sensor to detect a magnetic force of the magnet. Based on an output voltage from the magnetic sensor, the controller 130 may determine whether the front cover 3*a* is opened or closed. However, the interlock switch 131 to detect whether the front cover 3*a* is opened or closed has the following advantage. The opening-and-closing detection system including the interlock switch 131 can reduce the number of components to be smaller than other opening and closing detection systems including additional components to detect whether the front cover 3*a* is opened or closed. As a result, the cost of the image forming apparatus can be reduced.

The controller 130 is coupled to the energization detector 132, a remaining amount detector 134 that detects the amount of toner remaining in each of the toner bottles 14Y, 14M, 14C, and 14K, a control panel 135, and the switch 133 that turns on or off the energization of the solenoid 42.

The remaining amount detector 134 may use any one of various detection methods. For example, the remaining amount detector 134 may determine the amount of toner remaining in each of the toner bottles based on a calculation result of a toner consumption amount in each color image that can be calculated from a number of sheets printed and other factors. Alternatively, the remaining amount detector 134 may determine the amount of toner remaining in each of the toner bottles based on an electrostatic capacity in each of the toner bottles 14 or an electrostatic capacity in a toner conveyance path to convey each toner from the toner bottle 14 to the corresponding developing device.

When the remaining amount detector 134 detects the toner depletion of any one of the yellow, magenta, cyan, and black toners in the toner bottles 14, the controller 130 controls the control panel 135 to display a notification indicating the toner bottle in which the toner depletion is detected and an instruction to replace the toner bottle with a new toner bottle 14. In addition, the controller 130 determines whether the front cover 3*a* is opened based on detection results of the energization detector 132 that detects whether the interlock switch 131 is turned on or off when the remaining amount detector 134 detects the toner depletion. In response to determination that the front cover 3*a* is opened, the controller 130 turns on the switch 133. As a result, the 24V power supply supplies electric power to the solenoid 42 to open the lock of the bottle cover 20 corresponding to the toner bottle in which the toner depletion is detected.

In the present embodiment, opening the front cover 3*a* turns off the interlock switch 131 but does not turn off the switch 133 to supply power to the solenoid 42. If the solenoid 42 causes a short circuit, an excessive current flows to the solenoid 42. The fuse 136 shuts off the excessive current to protect circuits in the apparatus main body.

Figure 15:
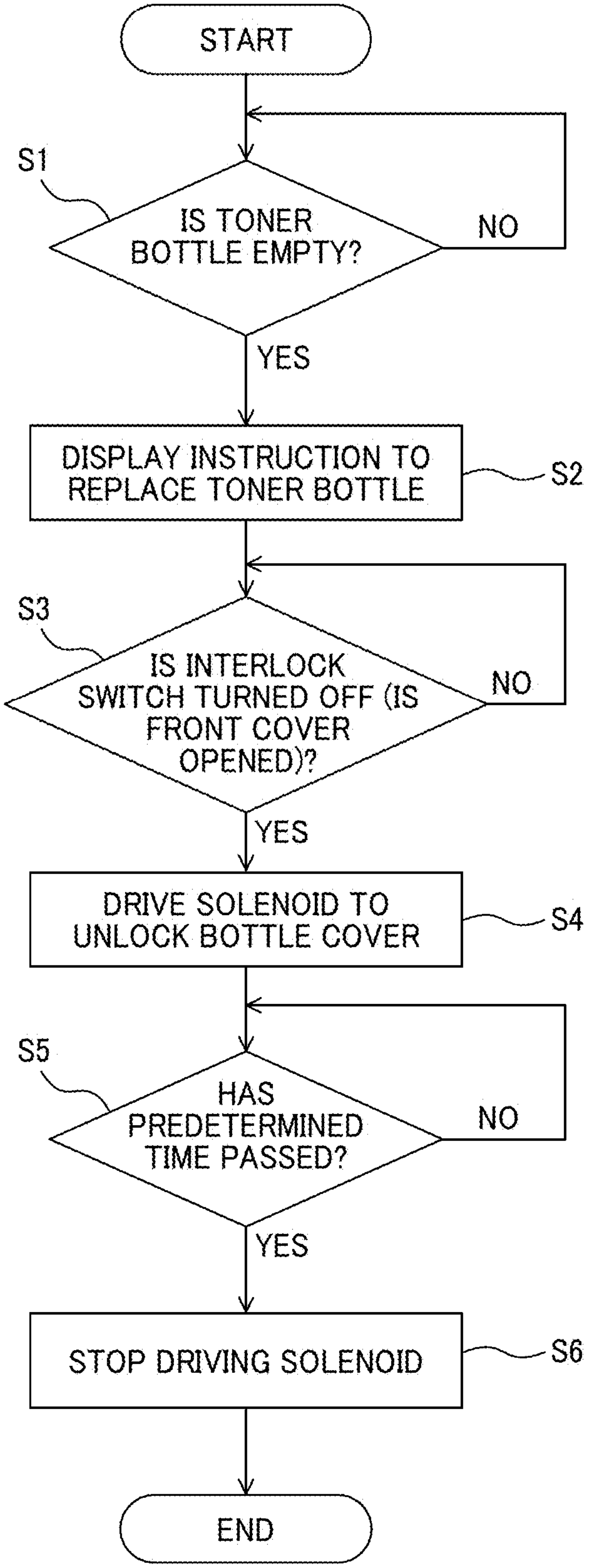
FIG. 15 is a flowchart of control to unlock the bottle cover.

FIG. 15 is a flowchart of control to unlock the bottle cover 20.

When the remaining amount detector 134 detects the toner depletion of any one of the yellow, magenta, cyan, and black toners in the toner bottles 14 (Yes in step S1), the controller 130 controls the control panel 135 to display the instruction to replace the toner bottle in which the toner depletion is detected with a new toner bottle 14 in step S2.

The user opens the front cover 3*a* to replace the toner bottle 14 with a new one. Opening the front cover 3*a* turns off the interlock switch 131, and the controller 130 detects that the front cover 3*a* has been opened (Yes in S3).

After the controller 130 detects that the front cover 3*a* is opened, the controller 130 turns on the switch 133 to energize the solenoid 42 and drives the solenoid 42 in step S4. The driven solenoid 42 rotates the lock lever 41 to unlock the bottle cover 20 as described above. As a result, the above-described control opens the bottle cover 20 corresponding to the toner bottle 14 in which the toner depletion is detected together with the front cover 3*a* and exposes the toner bottle 14 in which the toner depletion is detected. Opening the bottle cover 20 corresponding to the toner bottle 14 in which the toner depletion is detected as described above enables the user to easily specify the toner bottle 14 to be replaced, and the replacement workability of the toner bottle 14 can be enhanced.

After the controller 130 turns on the switch 133 to start energization of the solenoid 42, the controller 130 starts measuring time. In response to the elapse of a predetermined amount of time (Yes in step S5), the controller 130 turns off the switch 133 to cut off the energization to the solenoid 42 and stop the driving of the solenoid 42 in step S6.

In the present embodiment, the controller 130 detects that the front cover 3*a* is opened based on the interlock switch 131 that is turned off and unlocks the bottle cover corresponding to the toner bottle in which the toner depletion is detected. Unlocking the bottle cover causes opening the bottle cover 20 together with the front cover 3*a*. Since the bottle cover is opened, the controller 130 may stop driving the solenoid and return the lock lever 41 to the lock position to lock the bottle cover in response to the elapse of the predetermined amount of time after the start of driving of the solenoid. The above-described structure and control can reduce the energization time to the solenoid. For example, the controller may energize the solenoid to unlock the bottle cover after the remaining amount detector 134 detects the toner depletion and cut off the energization to the solenoid after the controller detects that the bottle cover is opened. However, the energization time to the solenoid in such a structure and control is longer than the energization time to the solenoid in the present embodiment.

In the present embodiment, the controller 130 unlock the bottle cover corresponding to the toner bottle in which the toner depletion is detected, and the bottle cover corresponding to the toner bottle in which the toner depletion is detected automatically opens. The above-described structure and control can enhance the replacement workability of the toner bottle 14 to be better than an image forming apparatus in which the user operates the control panel to unlock the bottle cover corresponding to the toner bottle in which the toner depletion is detected.

In the present embodiment, the solenoid rotates the lock lever 41, but the present disclosure is not limited to this. For example, a gear mechanism may rotate the lock lever 41.

The above-described embodiments are illustrative and do not limit this disclosure. Thus, numerous additional modifications and variations are possible in light of the above teachings. For example, elements and/or features of different illustrative embodiments may be combined with each other and/or substituted for each other within the scope of this disclosure.

The configurations according to the above-described embodiments are examples, and embodiments of the present disclosure are not limited to the above. For example, the following aspects can achieve the effects described below.

(First Aspect)

In a first aspect, an image forming apparatus includes a housing such as the bottle housing 70. The housing stores a toner bottle such as the toner bottle 14. The housing has an insertion opening such as the bottle insertion opening 71 and a cover such as the bottle cover 20. The toner bottle is insertable to the insertion opening. The cover has an opening and openably closable the insertion opening. The toner bottle is visible from the opening of the cover at a closed position.

According to the first aspect, as described in the present embodiment, the above-described configuration enables checking a state of the toner bottle attached to the apparatus main body, such as a driving state of the toner bottle or a toner remaining amount from the opening without opening the cover. (Second aspect) In a second aspect, the image forming apparatus according to the first aspect includes a projecting component such as the second operation lever 172, and at least a part of the projecting component enters the opening of the cover opened. According to the second aspect, the projecting component positioned so as to butt the opened cover enters the opening of the opened cover, and the cover can be opened at a desired opening angle. The above-described configuration does not restrict the position of the projecting component and can enhance the degree of freedom in the layout of the components.

(Third Aspect)

In a third aspect, the housing in the image forming apparatus according to the first aspect or the second aspect has multiple insertion openings including the insertion opening and multiple covers including the cover openably closable the multiple insertion openings, respectively. At least one of the multiple covers has the opening such as the opening 25, and at least one of toner bottles is visible from the opening of the at least one of the multiple covers at the closed position. According to the third aspect, as described in the present embodiment, the above-described configuration enables checking states of multiple toner bottles attached to the apparatus main body, such as driving states of the toner bottles or toner remaining amounts from the opening without opening the cover.

(Fourth Aspect)

In a fourth aspect, the image forming apparatus according to the third aspect includes a projecting component such as the second operation lever 172, and at least a part of the projecting component enters the opening of the cover opened. According to the fourth aspect, as described in the present embodiment, the multiple covers can be opened by the same opening angle. In addition, the multiple covers that are opened can contact the same component (in the present embodiment, the front transfer unit cover 15*a*).

(Fifth Aspect)

In a fifth aspect, each of the multiple covers in the image forming apparatus according to the third aspect or the fourth aspect has the opening such as the opening 25.

As described in the embodiment, the configuration according the fifth aspect can reduce a component management cost and a manufacturing cost of the image forming apparatus. In addition, the above-described configuration enables checking states of all the toner bottles inserted into the insertion openings, such as a driving state of each of the toner bottles or toner remaining amount of each toner bottle from the openings.

(Sixth Aspect)

In a sixth aspect, the projecting component in the image forming apparatus according to any one of the second to fifth aspects includes an operation lever such as the second operation lever 172 rotatable around a rotation shaft such as the second rotation shaft 172*a*.

According to the sixth aspect, as described in the present embodiment, the opened bottle cover does not come into contact with the operation lever such as the second operation lever 172. If the front cover 3*a* is closed when the bottle cover 20 is not closed, the front cover 3*a* butts against the bottle cover and applies impact to the bottle cover, which may cause damage or deformation of the rotation shaft. The above-described configuration can prevent the damage and the deformation of the rotation shaft. As a result, the operation lever can be typically operated to perform a predetermined operation.

(Seventh Aspect)

In a seventh aspect, an opening angle of the bottle cover in the image forming apparatus according to any one of the first to sixth aspects is 90° or more.

As described in the present embodiment, the configuration according to the seventh aspect can prevent the bottle cover 20 from colliding with the toner bottle 14 to be replaced and enables easily replacing the toner bottle.

(Eighth Aspect)

In an eighth aspect, the opening angle of the cover in the image forming apparatus according to the seventh aspect is 180° or less, and the cover includes a decal on a cover face facing the insertion opening at the closed position of the cover. As described in the present embodiment, the configuration according to the eighth aspect enhances the visibility of the decal such as the color identification decal 26 after the bottle cover is opened.

(Ninth Aspect)

In a ninth aspect, an opening angle of each of the multiple covers in the image forming apparatus according to any one of the third to eighth aspects is 90° or more and 180° or less, and each of the multiple covers includes a color identification decal on a cover face facing the insertion opening at the closed position of the cover.

As described in the present embodiment, the configuration according to the ninth aspect enhances the visibility of the decal such as the color identification decal 26 after the bottle cover is opened.

(Tenth Aspect)

In a tenth aspect, the image forming apparatus according to any one of the first to ninth aspects further includes a deformable component such as the front transfer unit cover 15*a* to which the cover contacts at an opening position of the cover.

According to the tenth aspect, as described in the present embodiment, closing the front cover 3*a* when the bottle cover 20 is not closed causes the front cover 3*a* to butt against the bottle cover 20 and give impact to the bottle cover 20, but the deformable component such as the front transfer unit cover 15*a* made of resin bends and deforms to absorb the impact. The above-described structure can prevent breakage of the bottle cover 20.

(Eleventh Aspect)

In an eleventh aspect, the image forming apparatus according to any one of the first to tenth aspects further includes a lock such as the lock device 40 to lock the cover at the closed position.

According to the eleventh aspect, as described in the present embodiment, the lock unlocks the bottle cover corresponding to the toner bottle in which the toner depletion is detected, and the bottle cover can be opened.

The above-described embodiments are illustrative and do not limit the present disclosure. Thus, numerous additional modifications and variations are possible in light of the above teachings. For example, elements and/or features of the embodiment and variation may be combined with each other and/or substituted for each other within the scope of the present disclosure.

The advantages achieved by the embodiments described above are examples and therefore are not limited to those described above.

The invention claimed is:

1. An image forming apparatus comprising:
a housing to store a toner bottle, the housing including:
an insertion opening to which the toner bottle is insertable; and
a cover including an opening and openably closable the insertion opening,
wherein the toner bottle is visible from the opening of the cover at a closed position,
wherein the image forming apparatus further comprises a projecting component,
wherein at least a part of the projecting component enters the opening of the cover when the cover is fully opened.

2. The image forming apparatus according to claim 1, wherein;
the housing includes:
multiple insertion openings including the insertion opening; and
multiple covers including the cover openably closable the multiple insertion openings, respectively,
at least one of the multiple covers has the opening, and
at least one of toner bottles is visible from the opening of the at least one of the multiple covers at the closed position.

3. The image forming apparatus according to claim 2, wherein:
the at least a part of the projecting component enters the opening of the at least one of the multiple covers opened.

4. The image forming apparatus according to claim 2, wherein each of the multiple covers has the opening.

5. The image forming apparatus according to claim 2, wherein;
an opening angle of each of the multiple covers is 90° or more and 180° or less, and
each of the multiple covers includes a color identification decal on a cover face facing the insertion opening at the closed position of the cover.

6. The image forming apparatus according to claim 1, wherein the projecting component includes an operation lever rotatable around a rotation shaft.

7. The image forming apparatus according to claim 1, wherein an opening angle of the cover is 90° or more.

8. The image forming apparatus according to claim 7, wherein;
the opening angle of the cover is 180° or less, and
the cover includes a decal on a cover face facing the insertion opening at the closed position of the cover.

9. The image forming apparatus according to claim 1, further comprising:
a deformable component to which the cover contacts at an opening position of the cover.

10. The image forming apparatus according to claim 1, further comprising:
a lock to lock the cover at the closed position of the cover.

11. The image forming apparatus according to claim 1, wherein:
at least a part of the projecting component enters the opening of the cover when the cover is fully opened.

12. The image forming apparatus according to claim 11, wherein the projecting component includes an operation lever rotatable around a rotation shaft.

13. The image forming apparatus according to claim 1, further comprising:
a lock to lock the cover at the closed position of the cover.

14. An image forming apparatus comprising:
a projecting component;
a housing to store a toner bottle, the housing including:
an insertion opening to which the toner bottle is insertable; and
a cover including an opening and openably closable the insertion opening,
wherein at least a part of the projecting component enters the opening of the cover from an outside surface of the cover, the outside surface is an opposite side of a surface to face the insertion opening, when the cover is fully opened.

15. An image forming apparatus comprising:
a housing to store a toner bottle, the housing including:
an insertion opening to which the toner bottle is insertable; and
a cover including an opening and openably closable the insertion opening,
wherein the toner bottle is visible from the opening of the cover at a closed position,
wherein the housing further includes:
multiple insertion openings including the insertion opening; and
multiple covers including the cover openably closable the multiple insertion openings, respectively,
at least one of the multiple covers has the opening, and at least one of toner bottles is visible from the opening of the at least one of the multiple covers at the closed position, the image forming apparatus further comprising a projecting component, wherein at least a part of the projecting component enters the opening of the at least one of the multiple covers opened.

16. The image forming apparatus according to claim 15, wherein each of the multiple covers has the opening.

17. The image forming apparatus according to claim 15, wherein an opening angle of the cover is 90° or more.

18. The image forming apparatus according to claim 17, wherein:

the opening angle of the cover is 180° or less, and the cover includes a decal on a cover face facing the insertion opening at the closed position of the cover.

19. The image forming apparatus according to claim 15, wherein:

an opening angle of each of the multiple covers is 90° or more and 180° or less, and each of the multiple covers includes a color identification decal on a cover face facing the insertion opening at the closed position of the cover.

20. The image forming apparatus according to claim 15, further comprising:

a deformable component to which the cover contacts at an opening position of the cover.

* * * * *